(12) United States Patent
Pan et al.

(10) Patent No.: US 9,000,609 B2
(45) Date of Patent: Apr. 7, 2015

(54) EXTENSION CORD WITH AC AND DC OUTPUTS FOR COUPLING AC AND DC SOURCES

(75) Inventors: Ching-Tsai Pan, Hsinchu (TW); Po-Yen Chen, Taipei (TW); Yu-Hsiang Lee, Taipei (TW); Hao-Chien Cheng, Kaohsiung (TW)

(73) Assignee: National Tsing Hua University, Hsinchu (TW)

( * ) Notice: Subject to any disclaimer, the term of this patent is extended or adjusted under 35 U.S.C. 154(b) by 535 days.

(21) Appl. No.: 13/415,342

(22) Filed: Mar. 8, 2012

(65) Prior Publication Data

US 2013/0175864 A1 Jul. 11, 2013

(30) Foreign Application Priority Data

Jan. 6, 2012 (TW) ................ 101100682 A (51) Int. Cl.
*H02J 3/00* (2006.01)
*G06F 1/26* (2006.01)
(52) U.S. Cl.
CPC ........................ *G06F 1/26* (2013.01)
(58) Field of Classification Search
CPC ....................................................... H02J 3/00

USPC .................................................. 307/26, 31
See application file for complete search history.

(56) References Cited

U.S. PATENT DOCUMENTS

| | | | | |
|---|---|---|---|---|
| 5,447,091 A * | 9/1995 | Sutton | .............. | 89/36.03 |
| 5,990,577 A * | 11/1999 | Kamioka et al. | .............. | 307/26 |
| 2006/0087800 A1* | 4/2006 | Savage | .............. | 361/601 |
| 2007/0103119 A1* | 5/2007 | Young | .............. | 320/130 |

* cited by examiner

*Primary Examiner* — Rexford Barnie
*Assistant Examiner* — Joseph Inge
(74) *Attorney, Agent, or Firm* — Birch, Stewart, Kolasch & Birch, LLP (57) ABSTRACT

An extension cord with AC and DC output, includes a first conducting line coupled to a positive end of a DC source and a first end of an AC source, a second conducting line coupled to a negative end of the DC source, a third conducting line coupled to a second end of the AC source, a first socket, and a second socket. The first socket includes a first node, a second node a third node respectively coupled to the first conducting line, the second conducting line, and the third conducting line. The second socket includes a fourth node, a fifth node and a sixth node respectively coupled to the first conducting line, the second conducting line, and the third conducting line. The second node floats when the first socket is provided with the AC output. The third node floats when the first socket is provided with the DC output.

10 Claims, 6 Drawing Sheets

EXTENSION CORD WITH AC AND DC OUTPUTS FOR COUPLING AC AND DC SOURCES

TECHNICAL FIELD

The present invention relates to an extension cord structure, more especially an extension cord with AC and DC outputs for coupling AC and DC sources.

BACKGROUND

In the CEATEC Japan 2009 exhibition hold in Makuhari Messe, lots of exhibitors, such as Panasonic, Sharp, and TDK, showed a new concept about "DC supplying room" which supply DC source to electronics equipment instead of conventional AC source. The advantage of DC powering is to reduce the carbon emission effectively. Nowadays, the power consumption of the IT equipments is increased rapidly, the global total power consumption of IT equipments of 2025 will increase to 9.4 times of 2006, and it occupied 15% of the global generated power. For Japan only, the total power consumption of IT equipments will be 5.2 times of the power consumption of 2006, and it occupied 20% of Japan's generated power. If the power system of the IT equipment can be changed from AC supplying system to DC supplying system, the power consumption of the IT equipment can reduce 10%~20%.

In addition, in order to prevent the power shut down, most of the data centers equipped uninterruptible power supply (UPS). Thus, the AC power comes from the power network will be converted to DC power by an AC/DC converter and the DC power will be stored into a power storage apparatus. Then, the stored DC power will be converted to AC power before provide to the IT equipment, such as a server. After that, the power apparatus of the server will convert the received AC power into DC power and provides it to the equipment. In other words, the power sent from the power network will be AC/DC converted at least 3 times before it powering the equipment. The power loss caused from the power conversion is around 27% after three times conversions even the efficient of power conversion is as high as 90%. Thus, if we can DC powering the equipment directly, the power lose of the power conversion can reduce dramatically to decrease the power consumption further to reduce the carbon emission.

Nikkei Electronics and the environmental and energy department of NPO held a seminar about the trend of photovoltaic, lithium ion battery, and DC powering on Oct. 21, 2010. During this seminar, the chairman of the advance technology development department has a speech about the develop tendency of DC wiring system and the smart-housing based on the Home Energy Management Systems (HEMS). In addition, on the 2010 CEATEC exhibition, Panasonic and Sony show a concept to integrate the battery and the DC power. Wherein, Panasonic disclosed a new generation of the distribution panel called "Smart Energy Gateway" (SEG) which combines the solar cell and the battery. SEG can provide the DC power and also the AC power. The SEG distribution panel can control the power consumption of each electronic device, light apparatus in your house and execute the management function to manage all electronic devices. Sony displayed how the DC power, which stored in the phospho-olivine energy storage module, drives the LCD TV. The capacity of the phospho-olivine energy storage module is 1.2 KWH which is capable to support the AC and DC outputs.

Figure 1:
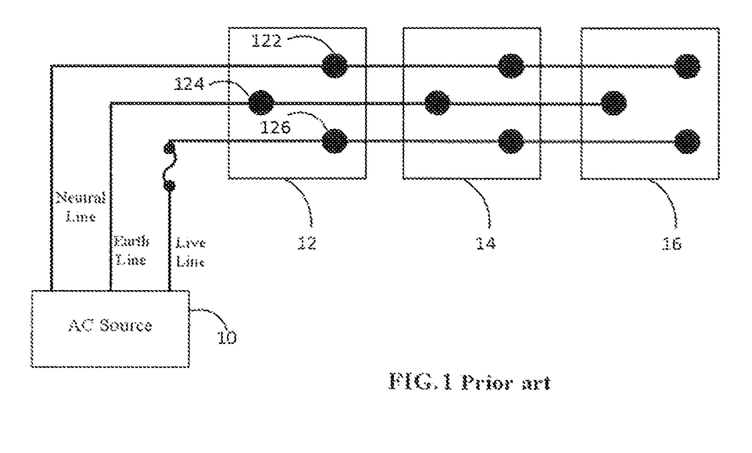
FIG. 1 illustrates a conventional structure of extension cord.

FIG. 1 illustrates a conventional structure of extension cord. Due to the domestic power source is single phase currently, the conventional extension cord includes a conducting line (live wire) which used to transfer the AC power, and the live wire and another conducting line (neutral line) form a loop. Most of plugs and sockets further configured a third slot for connecting to an earth line for grounded the equipment in order to avoid the leakage damage. However, the aforementioned structure of the extension cord can only applied in the AC input and AC output system.

SUMMARY

One of the purposes of the invention is to disclose an extension cord which providing DC and AC outputs simultaneously.

One of the purposes of the invention is to disclose an extension cord which providing DC and AC outputs simultaneously by switching in wireless method.

In one embodiment, an extension cord with an AC output and a DC output for coupling an AC source and a DC source is disclosed, the extension cord includes a first conducting line, coupled to a positive end of said DC source and coupled to a first end of said AC source; a second conducting line, coupled to a negative end of said DC source; a third conducting line, coupled to a second end of said AC source; a first socket, includes a first node, coupled to said first conducting line; a second node, coupled to said second conducting line; and a third node, coupled to said third conducting line; a second socket includes a fourth node, coupled to said first conducting line; a fifth node, coupled to said second conducting line; and a sixth node, coupled to said third conducting line; wherein, said second conducting line is floated when said first socket provides said AC output, and wherein, said third node is floated when said first socket provides said DC output.

In one embodiment, an extension cord with an AC output and a DC output for coupling an AC source and a DC source is disclosed, the extension cord includes a first conducting line coupled to a first end of said AC source; a second conducting line coupled to a positive end of said DC source; a third conducting line coupled to a negative end of said DC source; a fourth conducting line coupled to a second end of said AC source; a first socket includes a first node coupled to said first conducting line; a second node coupled to said second conducting line; and a third node; a second socket includes a fourth node coupled to said first conducting line; a fifth node coupled to said second conducting line; and a sixth node; a first switching circuit coupled between said third node, said third conducting line, and said fourth conducting line; a second switching circuit coupled between said sixth node, said third conducting line, and said fourth conducting line; a processor operable for providing a switching signal to said first switching circuit or said second switching circuit; wherein said first switching circuit couples said third node to said third conducting line, said fourth conducting line or floats said third node according to said switching signal, and wherein said second switching circuit couples said sixth node to said third conducting line, said forth conducting line or floats said sixth node according to said switching signal.

In one preferred embodiment, each socket equips a switch respectively for determining whether the corresponding socket supply the corresponding power or not.

BRIEF DESCRIPTION OF THE DRAWINGS

Features and advantages of embodiments of the subject matter will become apparent as the following detailed description proceeds, and upon reference to the drawings, wherein like numerals depict like parts, and in which.

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

In fact, not only IT equipment supplied by AC resource, television and 3C digital products are supplied by DC power which converted from AC power by the AC adapter or the insider converter. Air conditioner and laundry machine which configured with inverter are supplied by high frequency AC power which converted from a DC power that converted from an AC power thereof. However, the electronic products which supplied by AC power are widely applied in our life environment. Thus, in order to cooperate with the DC-oriented product and reduce the energy lost caused from power conversions, the present invention provides an extension cord with AC and DC outputs. When the extension cord couples to the AC power and DC power system, the extension cord integrates with the transformation circuit of the AC and DC power systems so as to provide the AC output and DC output to load. As a result, the present invention can reduce the usage difficulty when using the DC power and compatible with the new DC-oriented household appliance with higher efficiency.

Figure 2:
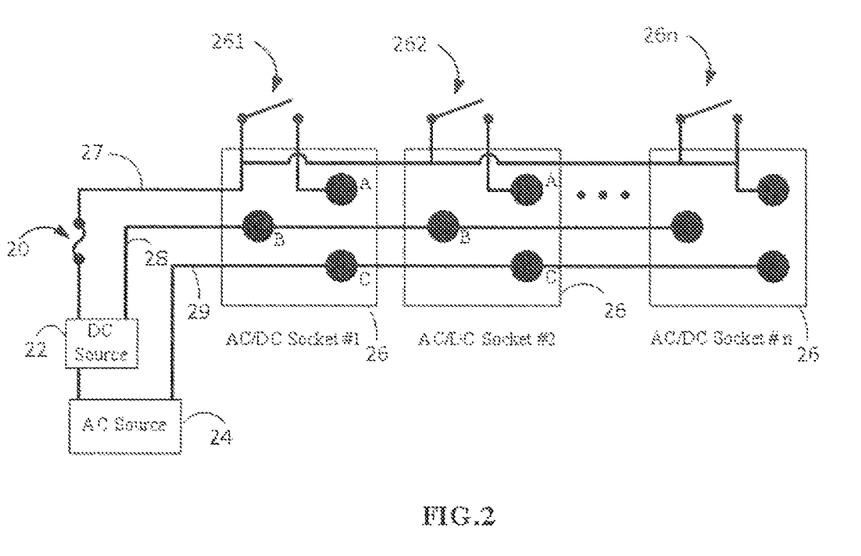
FIG. 2 illustrates a circuit topology of extension cord, in accordance with one embodiment of the present invention.

FIG. 2 illustrates a circuit topology of extension cord, in accordance with one embodiment of the present invention, The extension cord includes a plurality of 3-pin sockets 26 which has single slot (numbered as AC/DC socket_1~AC/DC socket_N). The extension cord further includes a plurality of switches 261~26N, a non-fused breaker, and a three-slot power cord. The AC/DC socket_1~AC/DC socket_N include node A, node B and node C, respectively. Wherein, the node A is the node of the AC output and also the node of the positive of the DC output. And wherein, the node B is the node of the negative of the DC output, and the node C is the node of the AC output. The three-slot power cord includes a first conducting line 27 which is a neutral line couples the node A to a positive end of a DC source 22 and an AC source 24 via the switch 261~26N and a fuse 20. The three-slot power cord further includes a second conducting line 28 couples the node B to a negative end of the DC source 22 and includes a third conducting line 29 couples the node C to the AC source 24.

Figure 3:
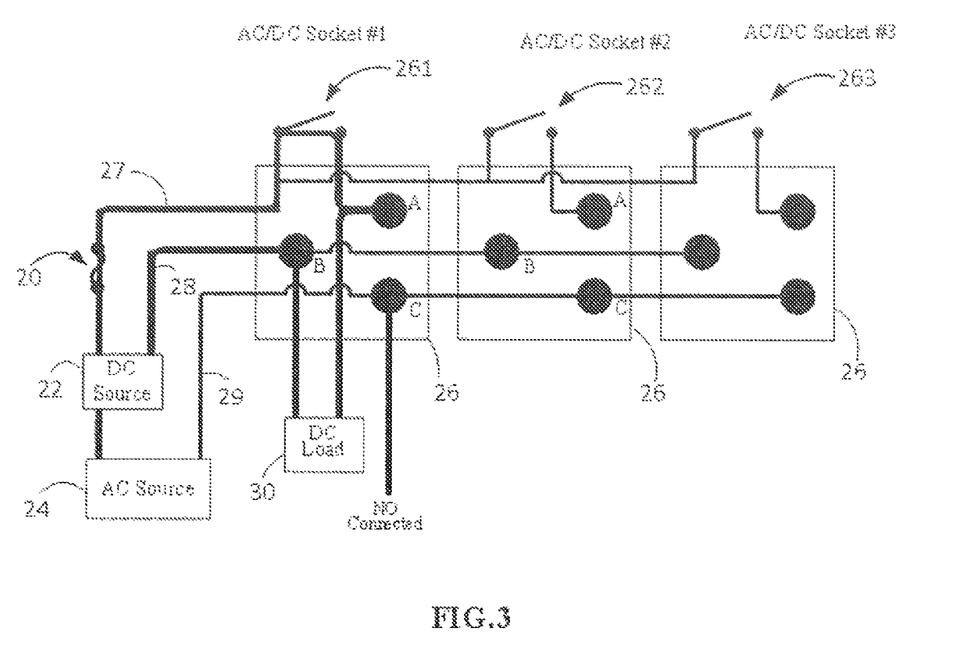
FIG. 3 illustrates a schematic of supplying DC output supplied by the extension cord of FIG. 2 in accordance with one embodiment of the present invention.

Refer to FIG. 3, which illustrates the present invention by three sockets. In one embodiment, when supplying a DC output on AC/DC socket_1, the switch 261 of the AC/DC socket_1 is turned off to couple the node A to the positive end of the DC source 22 via the first conducting line 27 and the fuse 20. And coupling a DC load 30 between the node A and the node B and floating the node C (non-connected). As a result, the AC/DC socket_1 can provide a DC output to the DC load 30.

Figure 4:
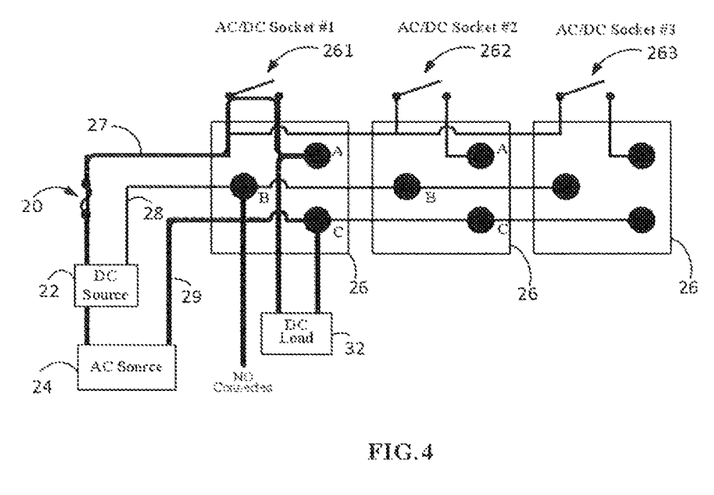
FIG. 4 illustrates a schematic of supplying AC output supplied by the extension cord of FIG. 2 in accordance with one embodiment of the present invention.

Please refer to FIG. 4, in one embodiment, when supplying an AC output on AC/DC socket_1, the switch 261 of the AC/DC socket_1 is turned off to couple an AC load 32 between the node A and the node C.

Figure 5:
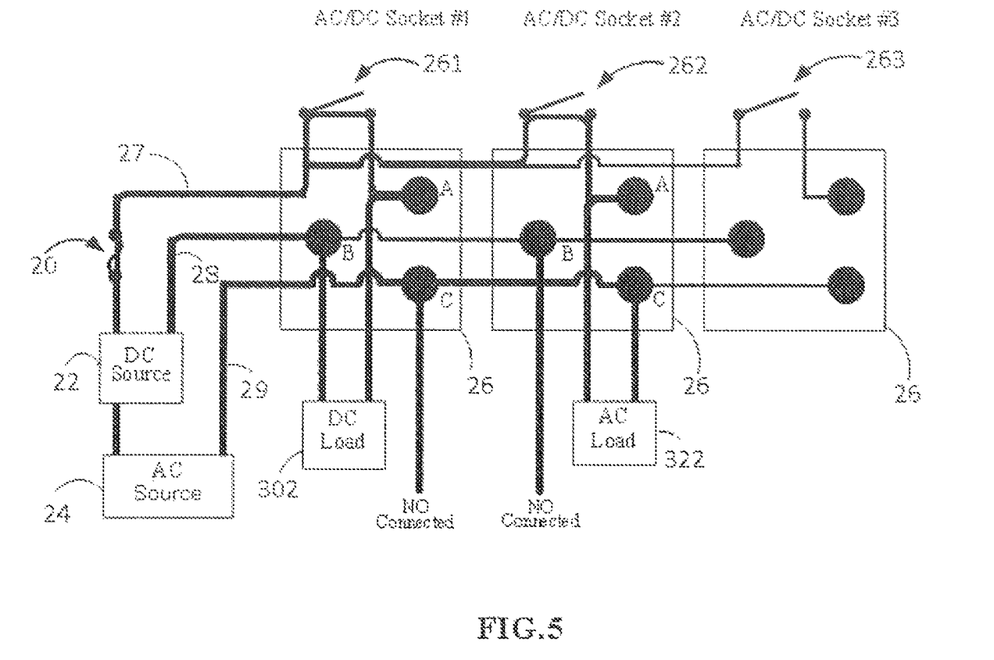
FIG. 5 illustrates a schematic of supplying both DC output and AC output supplied by the extension cord of FIG. 2 in accordance with one embodiment of the present invention.

Please refer to FIG. 5, when supplying the DC output and the AC output simultaneously, in one embodiment, the switch 261 of the AC/DC socket_1 and the switch 262 if the AC/DC socket_2 are turned off to couple a DC load 302 between the node A and the node B of the AC/DC socket_1, and to couple an AC load 322 between the node A and the node C of the AC/DC socket_2. So as to form a DC loop and an AC loop on the AC/DC socket_1 and the AC/DC socket_2 respectively, and powering the DC load 302 and the AC load 322 simultaneously. Nowadays, most of the power requirements of the household appliances we used, such as television, personal computer, telephone, printer, cell phone, game controller and handheld music player, etc, are DC format. Laundry machine, air conditioner, fluorescent lamps are equipped inverter to convert the AC power into required DC power, then convert the DC power into an AC power with different frequency by using a DC/AC converter. So as to provide an AC power which with a required-frequency to the load. However, the conventional extension cord on the market just only can be applied on the AC power system. The conventional extension cord can not satisfy the requirement that supply AC and DC power simultaneously.

With the matured development of the DC supplying technology and the micro-grid generation system, when the power system supplies DC power, the power conversion circuit can omit the power factor correction circuit so as to reduce the cost and down size the whole circuit. Further, it can decrease the power consumption caused by power conversion.

Aforementioned, the user can selectively turn on or turn of switches 261~26N to determine whether the corresponding socket supply the power or not.

Figure 6:
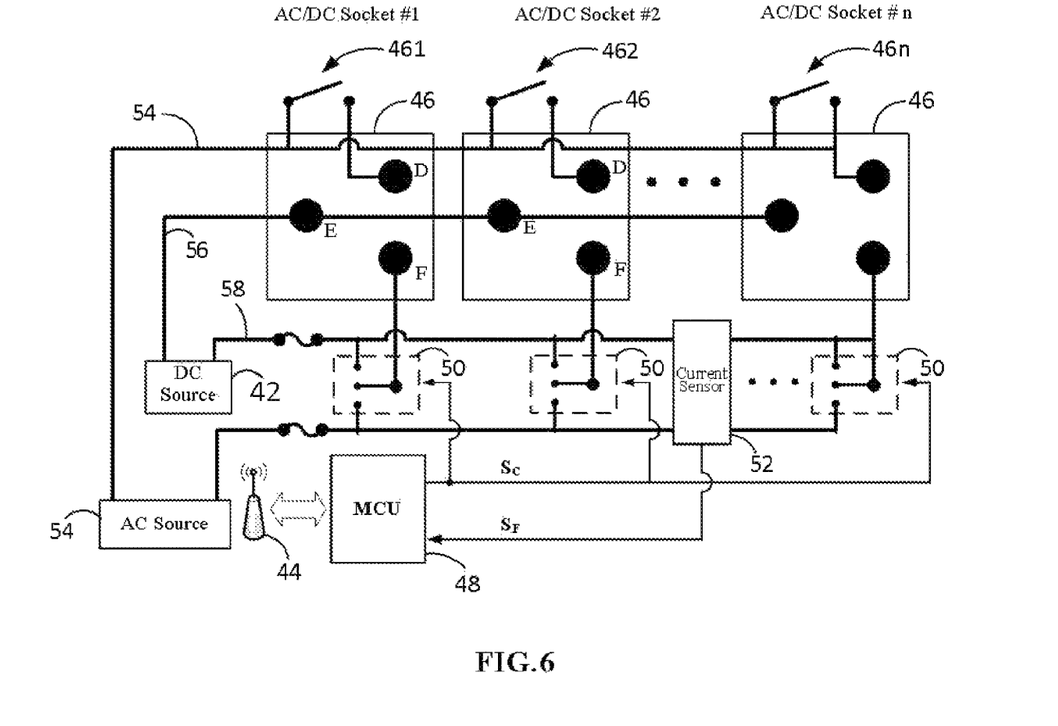
FIG. 6 illustrates a structure of extension cord in accordance with another embodiment of the present invention.

FIG. 6 illustrates a structure of extension cord in accordance with another embodiment of the present invention. In this embodiment, a wireless module 44 is provided for the user to remote control. In the socket 46, the node D couples to the conducting line 54 via a switch 461, and the conducting line 54 couples to one end of an AC source 40. The node E in the socket 46 couples to a positive end of a DC source 42 via a conducting line 56. A conducting line 58 couples to a negative end of the DC source 42. And a conducting line 60 couples to the other end of the AC source 40. Wherein, the conducting line 58 and 60 are configured fuses, respectively. A switching circuit 50 coupled between a node F, the conducting line 58 and the conducting line 60 and switching under the control of a control signal $S_C$ which provided by a micro processor (MCU) 48, so as to couple the node F to the conducting line 58 or the conducting 60, thus to provide DC/AC outputs. In this embodiment, the present extension cord further configures a current sensor 52 to detect the change of the current flowing through the conducting line 58 and the conducting line 60, and to provide a feedback signal $S_F$ to MCU 48. The feedback signal $S_F$ is transferred back to the system (not shown) via the wireless module 44 and the system controls the MCU 48 to output the control signal $S_C$ to change the operation of the switching circuit 50, so as to enable or disable the power supplying of the appliances. In this embodiment, the switch 461~46N are equipped for the user to determine the whether the corresponding socket supplies the power or not. In other embodiment, the switch 461~46N can be omitted to directly couple the node D to the conducting line 54 and the MCU 48 decides whether the socket 46 supplies the power or not.

The present invention discloses an extension cord with AC output nodes and DC output nodes to output both AC and DC power. The AC output nodes can provide AC power to the load and the DC output nodes and provide DC power to the load. In other words, the extension cord in accordance with one embodiment of the present invention receives AC and DC power simultaneously and provides the received AC or DC power to corresponding loads. The extension cord of the present invention can just operates in the powering system of AC power or DC power. Due to the transmission path of the AC power is different from the transmission path of the DC power, so that can avoid disturbance between the AC and DC power and can achieve the goal to supply the AC power or the DC power to the load.

Two power supplying systems (AC/DC) will co-exist for a long time when the power supplying system transfers from the conventional AC system to DC system. As a result, the user will misuse the incorrect supplying system to powering the appliance. Thus, every kind of household appliance must change their design to respond accordingly. The present invention disclosed an extension cord with three-slot socket which can assist the designer of the household appliance to design the correct, friendly plug for user, and furthermore to avoid the risk of supplying the wrong power. The plug of the DC household appliance can be designed as three-pin, wherein the pin which corresponds to the node C is pre-designed as floating in order to make sure the power supplied to the appliance is DC power. Similarly, the pin of the plug of the AC household appliance which corresponds to the node B is pre-designed as floating in order to make sure the power supplied to the appliance is AC power.

While the foregoing description and drawings represent embodiments of the present invention, it will be understood that various additions, modifications and substitutions may be made therein without departing from the spirit and scope of the principles of the present invention. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, and not limited to the foregoing description.

What is claimed is:

1. An extension cord with an AC output and a DC output for coupling an AC source and a DC source, comprising:
   a first conducting line, coupled to a positive end of said DC source and coupled to a first end of said AC source;
   a second conducting line, coupled to a negative end of said DC source;
   a third conducting line, coupled to a second end of said AC source;
   a first socket, comprising:
      a first node, coupled to said first conducting line;
      a second node, coupled to said second conducting line; and
      a third node, coupled to said third conducting line;
   a second socket, comprising:
      a fourth node, coupled to said first conducting line;
      a fifth node, coupled to said second conducting line; and
      a sixth node, coupled to said third conducting line;
   wherein, said second node is floated when said first socket provides said AC output, and wherein, said third node is floated when said first socket provides said DC output.

2. The extension cord as claimed in claim 1, further comprising a fuse configured on said first conducting line.

3. The extension cord as claimed in claim 1, wherein said first/second socket provides said DC output via said first/fourth node and said second/fifth node.

4. The extension cord as claimed in claim 1, wherein said first/second socket provides said AC output via said first/fourth node and said third/sixth node.

5. The extension cord as claimed in claim 1, wherein said first/second socket further comprises a first/second switch configured between said first/fourth node and said first conducting line.

6. An extension cord with an AC output and a DC output for coupling an AC source and a DC source, comprising:
   a first conducting line coupled to a first end of said AC source;
   a second conducting line coupled to a positive end of said DC source;
   a third conducting line coupled to a negative end of said DC source;
   a fourth conducting line coupled to a second end of said AC source;
   a first socket, comprising:
      a first node coupled to said first conducting line;
      a second node coupled to said second conducting line; and
      a third node;
   a second socket, comprising:
      a fourth node coupled to said first conducting line;
      a fifth node coupled to said second conducting line; and
      a sixth node;
   a first switching circuit coupled between said third node, said third conducting line, and said fourth conducting line;
   a second switching circuit coupled between said sixth node, said third conducting line, and said fourth conducting line;
   a processor operable for providing a switching signal to said first switching circuit or said second switching circuit;
   wherein said first switching circuit couples said third node to said third conducting line, said fourth conducting line or floats said third node according to said switching signal, and wherein said second switching circuit couples said sixth node to said third conducting line, said forth conducting line or floats said sixth node according to said switching signal.

7. The extension cord as claimed in claim 6, further comprising:
   a first switching configured between said first node and first conducting line; and a second switching configured between said fourth node and said first conducting line.

8. The extension cord as claimed in claim 6, further comprising a current sensor to detect a current flowing through said second conducting line and said third conducting line, in order to provide a feedback signal to said processor.

9. The extension cord as claimed in claim 8, further comprising a wireless module coupled to said processor, said wireless module operable for receiving a wireless control signal and providing said wireless control signal to said processor to generate said switching signal.

10. The extension cord as claimed in claim 8, further comprising a wireless module coupled to said processor, said wireless module operable for receiving a wireless control signal and providing said wireless control signal to said processor to generate said switching signal, wherein said processor outputs said feedback signal to a system via said wireless module.

* * * * *